April 22, 1952  P. S. DICKEY  2,593,659
BOILER EFFICIENCY INSTRUMENT
Filed Jan. 9, 1948  2 SHEETS—SHEET 1

INVENTOR.
PAUL S. DICKEY
BY
Raymond D. Junkins
ATTORNEY

April 22, 1952  P. S. DICKEY  2,593,659
BOILER EFFICIENCY INSTRUMENT
Filed Jan. 9, 1948  2 SHEETS—SHEET 2

INVENTOR.
PAUL S. DICKEY
BY
Raymond W. Junkins
ATTORNEY

Patented Apr. 22, 1952

2,593,659

UNITED STATES PATENT OFFICE 2,593,659

BOILER EFFICIENCY INSTRUMENT

Paul S. Dickey, East Cleveland, Ohio, assignor to Bailey Meter Company, a corporation of Delaware Application January 9, 1948, Serial No. 1,463

6 Claims. (Cl. 73—112)

This invention relates to the art of power plant instruments and is particularly directed to providing instruments for measuring and visually exhibiting variables in the operation of power producing or utilizing apparatus. The manifestation may be in terms of values of the variables or of some function of the variables; or a result of inter-relation or comparison of two or more variables where such comparison results in the attainment of a desirable index as to the operating condition or efficiency of the power producing or utilizing apparatus.

One object of my present invention is to provide an efficiency meter for a vapor generator or boiler.

Another object is to provide an operating guide continuously informing an operator of the efficiency or operating condition of the vapor generator and to simultaneously make a permanent record of the condition.

A further object is to provide a relation gage to compare the heat output from a vapor generator with the heat input thereto and to visually advise the result.

A still further object is to provide a boiler efficiency meter wherein the B. t. u. supplied to the unit by way of fuel is compared to the B. t. u. output to ascertain the heat efficiency of operation.

Other objects will become apparent from a study of the specification and drawings describing my invention and from the claims.

Figure 1:
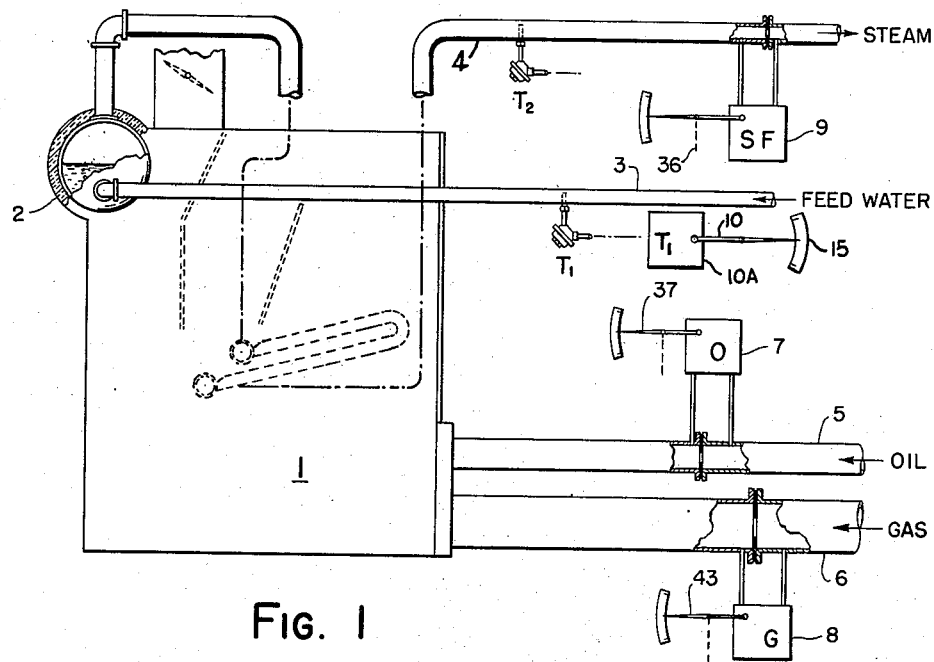
Fig. 1 is a diagrammatic representation of a vapor generator to which my invention may be applied.

Referring now to Fig. 1 I show therein, in somewhat diagrammatic fashion, a vapor generator 1 having a separation drum 2 to which feed water is supplied through a conduit 3 and from which steam discharges through a superheater and main conduit 4 to any point of usage. Fuel for combustion is supplied through the conduits 5 and 6 and in the present illustrative embodiment I have chosen to apply my invention to a vapor generator whose furnace utilizes the combustion of two dissimilar fuels. For example oil is supplied under pressure through the conduit 5 while natural or artificial gas may be supplied through the conduit 6. A rate of flow meter 7 is arranged to be responsive to the quantity of oil supplied to the furnace through the conduit 5 while a rate of flow meter 8 is similarly responsive to the quantity rate of gas supplied the furnace through the conduit 6. Assuming for the moment that the heat content per unit of the oil and the heat content per unit of the gas do not vary materially from instant to instant, then manually adjustable multipliers may be utilized to convert the rate of supply of the fuels to a B. t. u. basis whereby the total B. t. u. input to the furnace may be continuously ascertained.

To determine the B. t. u. output of the unit it is necessary to determine the difference between the heat contained in the feed water supplied and the heat contained in the steam discharged. Inasmuch as the same weight rate of steam leaves the boiler as enters in the form of feed water during normal operation it is only necessary to measure one or the other. Preferably I measure the steam flow by means of a rate meter 9 connected to the conduit 4 as a measure of total output and multiply this rate by the difference in B. t. u. content of the feed water and of the steam. I have found that I may use the temperature of the feed water and the temperature of the outgoing steam as measurable functions of the heat content of the water and steam. I thus provide, in connection with the conduit 3, a temperature measuring element $T_1$ and in connection with the conduit 4, a temperature measuring element $T_2$.

The temperature measuring element $T_1$ (also $T_2$) may be of the type disclosed in Patent 2,310,955 to Hornfeck. A thermocouple or resistance wire is subjected to the temperature to be measured and connected to an instrument 10A adapted to angularly move an arm 10 to positions representative of temperature.

Figure 3:
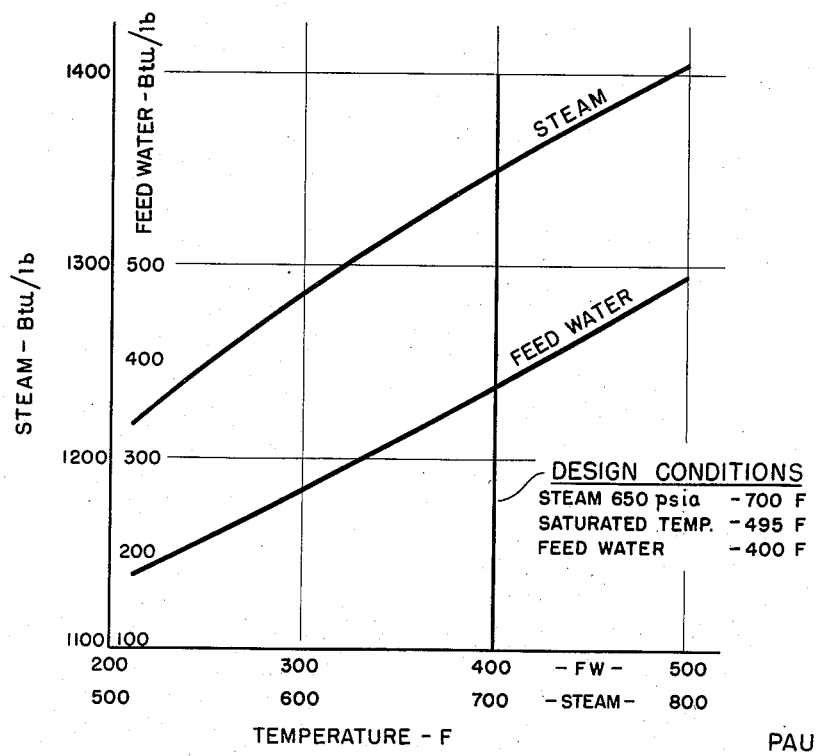
Fig. 3 is a graph of certain operating variables or conditions pertinent to the vapor generator of Fig. 1.

Reference will now be made to Fig. 3 wherein I have plotted in graphic form the relation between temperature and heat content for both feed water and steam under different conditions. As a premise I have chosen to consider that the power producing unit of Fig. 1 receives feed water at somewhat over 650 p. s. i. a. and at a temperature of 400° F. while the steam discharged through the conduit 4 is at a design condition of 650 p. s. i. a. and 700° F. with a saturation temperature of 495° F. From the steam tables it is seen that each pound of the feed water under these conditions has a heat value of 375 B. t. u. while each pound of steam under design conditions has a heat value of 1348 B. t. u. This is clearly shown in Fig. 3 and through the design conditions I have drawn a reference line vertically on the graph.

I furthermore assume that the pressure of the feed water supply and the pressure of the steam discharged remain substantially invariable although the effect of pressure variation upon heat content of either the water or the steam is substantially negligible. In fact a variation in steam pressure of ±100 p. s. i., at a constant temperature of 700° F., results in a heat content variation of not over ½% from the design condition value. I have therefore, in the present example, chosen to assume that expected operating deviations in pressure of the feed water or of the steam from design value will be of a minor nature and will not introduce any significant error into the calculation or the resulting answer provided as an operating guide.

An examination of the graphs of Fig. 3 will show that the plot of feed water is slightly concave downward while the plot of steam is slightly convex upward thus indicating a slight departure from true linearity in functional relation between temperature and heat content of each. At the same time it will be noted that for any reasonable expectancy of departure in one direction or the other from design conditions the relations are to all intents and purposes substantially linear and that therefore I may usually disregard this non-linearity in functional relationship.

Figure 2:
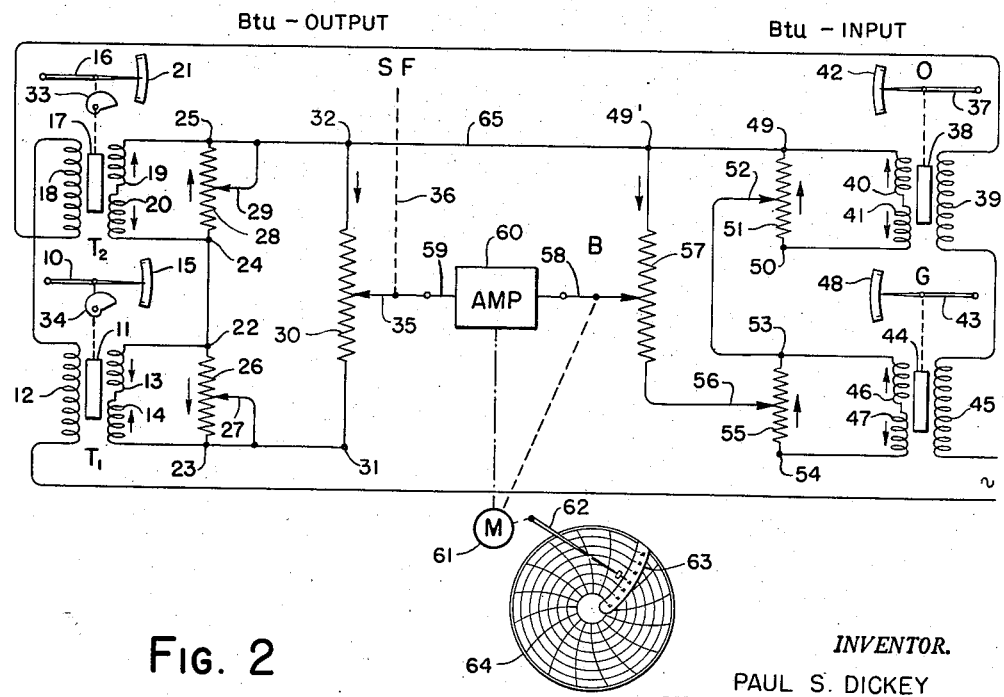
Fig. 2 is a schematic showing of an electric calculating network illustrating a preferred embodiment of my invention.

I will now refer particularly to Fig. 2 wherein I have schematically illustrated the calculating network for obtaining continuously an answer to the division of B. t. u. output by B. t. u. input of the unit. It will be understood that the designations applied to Fig. 2 of $T_1$, $T_2$, SF, O and G apply respectively to the continuous measurement of temperature of the feed water, temperature of the steam, rate of flow of the steam, rate of flow of the oil, and rate of flow of the gas, respectively of Fig. 1. These are the variables which, as previously pointed out, I desire to incorporate in my calculating network to arrive at an answer useful in guiding the operation of the unit.

The feed water temperature measuring element $T_1$ is arranged to position an arm 10 which in turn vertically positions a movable core piece 11 relative to a continuously energized primary winding and to a pair of bucking secondary windings 13, 14 connected in series. The arm 10 is also arranged to continuously indicate relative an index 15 the value of temperature $T_1$.

In similar fashion the steam temperature measuring device $T_2$ is arranged to position an arm 16 which in turn vertically positions a movable core member 17 of an adjustable transformer having a continuously energized primary winding 18 and a pair of bucking secondary windings 19, 20 connected in series. The arm 16 continuously advises, relative to an index 21, the temperature $T_2$ of the steam leaving the unit.

Across the terminals 22, 23 of the secondary windings 13, 14 is a resistance 26 contacted by a manually adjustable contact arm 27 thus providing a selectivity as to a portion of the resistance 26 which is to be included in circuit between the terminals 22, 23. In similar manner a contact 29 engages the resistance 28 to select the portion of the latter which is to be in circuit between the terminals 24, 25 across the secondary windings 19, 20. The terminals 22, 24 are connected by a conductor while the terminals 23, 25 are bridged by a resistance 30. The various electric elements mentioned comprise a subtraction circuit whereby a voltage across the terminals 31, 32 is representative of $T_2 - T_1$ in terms of B. t. u. content per lb. of the steam and of the feed water respectively. The necessary mechanical connecting linkage or electrical adjustment possibilities provide that the voltage across the terminals 24, 29 is representative of B. t. u. per pound of steam flowing through the conduit 4 while similar adjustability provides that the voltage across the terminals 22, 27 is representative of B. t. u. per pound of feed water entering the boiler through the conduit 3.

With the contacts 27 and 29 remaining in predetermined adjusted positions, the voltage drop in the portion of the resistance 26 between the terminal 22 and the contact 27 is representative of B. t. u. per lb. of feed water entering the boiler, and the voltage drop in the portion of the resistance 28 between the terminal 24 and the contact 29 is representative of B. t. u. per lb. of steam flowing through the conduit 4. The voltages across the resistances 26 and 28 are of opposite phase so that the voltage across the resistance 30 (equal to the difference between the voltage drops across the selected portions of the resistances 26 and 28) is representative of the difference between the B. t. u. content per lb. of steam and of the feed water, respectively. Voltages of opposite phase in the resistances 26 and 28 may be obtained either by arranging the windings of the transformer in the manner shown and positioning the core members 11 and 17 in the same directions on similar changes in the temperature of the feed water and steam, or by reversing the primary winding or the secondary windings of one transformer and positioning the core members in opposite directions on similar changes in temperature.

At 33 I show a cam, diagrammatically interposed between the $T_2$ lever arm 16 and the movable core 17, so that while the arm 16 provides a true indication of temperature upon the scale 21 the resultant positioning of the core member 17 takes into account the non-linear functional relationship between temperature and B. t. u. per pound of steam in accordance with the graph of Fig. 3. In similar manner a cam 34 is interposed between the temperature arm 10 and the core piece 11 so that while the index 15 reads correctly the temperature of the feed water entering the boiler the core piece 11 is positioned in accordance with the non-linear functional relation between $T_2$ and B. t. u. per pound of the feed water.

The steam flow meter 9 is adapted to position a contact arm 35 along the resistance 30 through the agency of a linkage 36. The resulting voltage between the terminal 32 and the contact arm 35 is dependent upon the position of the contact arm 35 along the resistance 30 and thereby dependent upon the rate of steam flow through the conduit 4. Thus the voltage condition between the terminal 32 and the contact arm 35 is a resultant of steam outflow in pounds per hour multiplied by the difference between the B. t. u. content per pound of the steam and the feed water in accordance with the following:

Voltage across 32—35 represents $$(T_2 - T_1) \times SF$$

where $T_2$ and $T_1$ are in terms of B. t. u./lb.,
SF is in terms of lb./hr., and Voltage across 32—35 is total B. t. u. output in B. t. u./hr. of the vapor generator, therefore B. t. u. output = $(T_2 - T_1) \times SF$ The right hand side of the network schematically shown in Fig. 2 determines the B. t. u. input by continuously measuring the heat supplied by oil and the heat supplied by gas through the conduits 5 and 6 respectively. The oil meter 7 has an arm 37 arranged to vertically position a core member 38 relative to a continuously energized primary winding 39 and a pair of bucking secondary windings 40, 41 connected in series. The arm 37 may at the same time comprise a pointer indicating the rate of flow of oil through the conduit 5 relative to an index 42.

In similar fashion the gas meter 8 has an arm 43 vertically positioning the movable core 44 of an adjustable transformer having a continuously energized primary winding 45 and a pair of bucking secondary windings 46, 47 connected in series. The arm 43 may indicate along an index 48 the rate of flow of gas supplied to the furnace 1 through the conduit 6.

Across the terminals 49, 50 of the secondary windings 40, 41 I show a resistance 51 having a movable contact 52. Similarly across the terminals 53, 54 of the secondary windings 46, 47 I show a resistance 55 having a movable contact arm 56. The contact arm 52 is joined to the terminal 53 while the contact arm 56 is effectively joined to the terminal 49′ through a resistor 57. The resistance 57 is engaged by a movable contact arm 58. Joining the arms 35, 58 is a conductor 59 in which is interposed an amplifier and motor control circuit 60 adapted to control direction and speed of rotation of a motor 61. The motor 61 positions the contact arm 58 for balancing the network and at the same time positions an indicator arm 62 relative to an index 63 and to record upon a time revoluble chart 64. The amplifier and motor control 60 as well as the motor 61 may be of the type disclosed and claimed in the copending application of Anthony J. Hornfeck, Serial No. 693,290, filed August 27, 1946, now Patent 2,544,790, granted March 13, 1951.

The elements 51, 52 may be manually adjusted the one relative to the other in accordance with the heating value in B. t. u. per pound of the oil which the meter 7 is measuring. Thus the voltage across the terminals 49, 50, resulting from the inductive coupling of the secondaries 40, 41 with the energized primary 39 through a positioning of the coupling core member 38 in accordance with rate of oil flow, is representative of such rate of oil flow in units which may be pounds per hour or otherwise as desired. That portion of the voltage across 49, 50 which exists between the contact 52 and the terminal 49′ is representative of the rate of supply of oil through the conduit 5 multiplied by the B. t. u. per lb. heat value of the oil.

In similar fashion the voltage effective across the terminals 53, 54 is representative of the rate of gas supplied through the conduit 6 and the voltage between the terminal 53 and the contact 56 is the resultant of rate of gas flow multiplied by its heat content in B. t. u. per cubic foot or other desirable unit of measurement. As previously mentioned I premise upon the expectation that the B. t. u. per unit of oil and the B. t. u. per unit of gas will not fluctuate widely from moment to moment. Periodically checks will be made to ascertain the heating value of the oil and of the gas and the manually adjustable contacts 52 and 56 would be moved relative to the related resistances 51 and 55.

The various elements of this portion of the circuit are so arranged as to add the rate of heat supplied by oil with the rate of heat supplied by gas so that the effective portion of the resistance 51 is added to the effective portion of the resistance 55 producing a voltage effect between the terminal 49′ and the contact 56 which is representative of such addition. Across the points 49′, 56 is inserted a resistance 57 and the arrangement is such that the balancing contact arm 58 is movable along the resistance 57 whereby the voltage between the terminal 49′ and the contact arm 58 is a resultant of the B. t. u. input multiplied by the position of balance. This may be expressed as follows:

Voltage across 49′ — 58 represents balance (B) $\times$ (oil B. t. u.+gas B. t. u.)

where

Oil B. t. u. is (O$\times$its B. t. u./lb.)

and

Gas B. t. u. is (G$\times$its B. t. u./cu. ft.)

therefore

B. t. u. input=(O$\times$B. t. u.)+(G$\times$B. t. u.) and voltage across 49′—58 is B$\times$B. t. u. input The portions of the circuit are connected in a balanceable network wherein heat output is shown at the left and heat input is shown at the right of Fig. 2. The terminals 32, 49′ are joined by a conductor 65 while the contact arms 35, 58 are joined by a conductor 59 in which is interposed the amplifier and motor control circuit 60. If the network is in balance no voltage unbalance exists in the conductor 59 and consequently the amplifier and motor control circuit 60 is quiescent and the motor 61 is unmoving. Under that condition any voltage existing between the terminal 32 and the contact 35 is equal to and counteracting the voltage existing between the terminal 49′ and the contact arm 58. If any one of the elements $T_1$, $T_2$, SF, O, or G is moved then the voltage conditions in the conductor 59 becomes unbalanced and the motor 61 is caused to rotate in direction proper to move the value of B until the network is again in balance. The overall operation of the network is to continually solve the equation:

$(T_2 - T_1) \times SF =$
  balance $\times$ (oil $\times$ B. t. u.)+(gas $\times$ B. t. u.)

so that $$\text{Balance} = \frac{(T_2 - T_1) \times SF}{(\text{oil} \times \text{B. t. u.}) + (\text{gas} \times \text{B. t. u.})}$$

$$= \frac{\text{B. t. u. output}}{\text{B. t. u. input}}$$

= Boiler efficiency in per cent

Thus the circuit of Fig. 2 continually performs the calculating process necessary to ascertain the efficiency of operation of the boiler 1 by dividing the rate of heat output by the rate of heat input and the resultant value may be expressed in percentage upon the index 63 and/or the recording chart 64. It will of course be noted that the result obtained through the use of my invention provides a determination of overall efficiency from heat input to heat output without in any respect segregating the losses in the unit. Such losses may of course be by radiation, excess air, poor heat transfer, etc. but the net result of all such losses is that some of the heat supplied in the form of fuel to the furnace does not appear as useful heat in the steam produced and discharged through the conduit 4. My invention provides a boiler efficiency meter which continuously provides an indication of the efficiency of operation of the boiler and this may be expressed in any desired units of which the most common would be efficiency in per cent.

Figure 4:
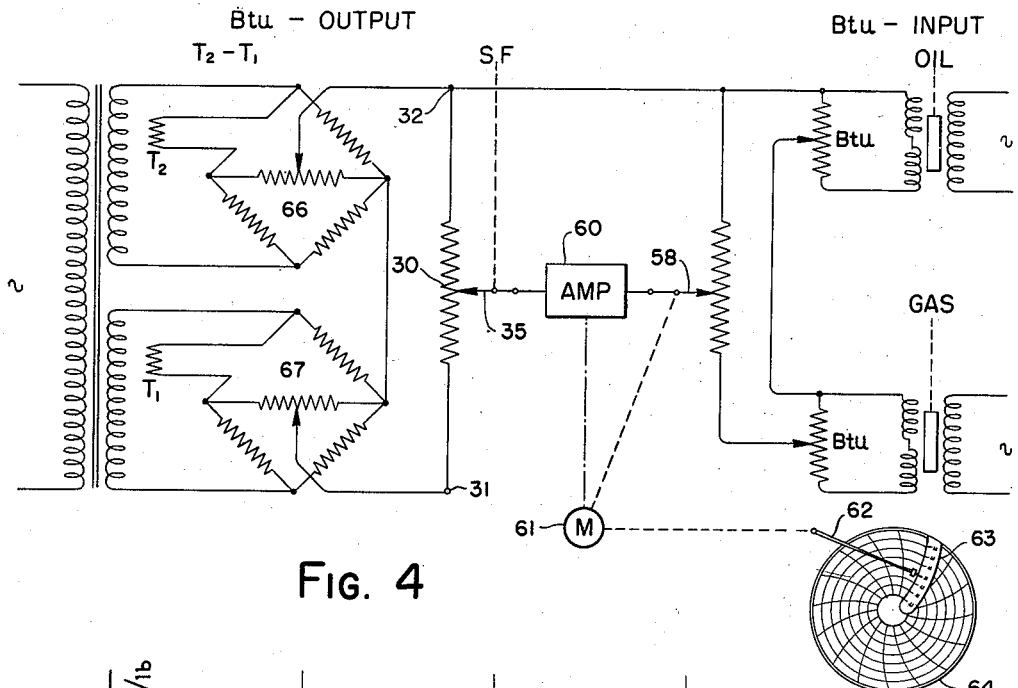
Fig. 4 is a schematic diagram embodying a second form of my invention.

In Fig. 4 I show a somewhat different circuit arrangement for accomplishing the same result as I have previously described in connection with Fig. 2. Herein the resistance element $T_1$ whose resistance varies with temperature of the feed water is included directly into a resistance bridge 67 while the resistance element $T_2$ is included in a bridge 66. The bridges 66, 67 are connected subtractively across the terminals 31, 32. Between the terminals 31, 32 is the resistor 30 along which is positioned the contact arm 35 responsive to rate of steam out flow. As in the circuit of Fig. 2 the present circuit performs the operation of continually dividing B. t. u. output by B. t. u. input to evolve an answer in efficiency of the boiler unit which is indicated relative to the index 63 and is recorded upon the chart 64.

While I have chosen to illustrate and describe certain preferred embodiments of my invention it will be understood that these are by way of example only and are not to be considered as limiting.

What I claim as new and desire to secure by Letters Patent of the United States, is:

1. An efficiency meter for a vapor generator having liquid supply means and heated by the combustion of a plurality of dissimilar fluid fuels, including in combination, a separate rate of flow meter for the supply stream of each of the fluid fuels, adjustable means in connection with each of said meters for applying to the measurement a multiplier representing the B. t. u. per unit heat value of the respective fluid fuel supply whereby an effect is obtained continuously representative of the total B. t. u. rate of each fuel, means adding the total B. t. u. rates to obtain a measurement of total B. t. u. rate supplied to the vapor generator for combustion for heating the same, a rate of flow meter for the vapor leaving the generator, a separate temperature measuring device for the liquid supply and for the vapor discharge streams, a calculating system interrelating the vapor flow meter and temperature devices continuously obtaining a measurement of total B. t. u. rate absorbed by the fluid passing through the vapor generator, and means continuously dividing the B. t. u. absorbed rate by the B. t. u. supply rate obtaining a manifestation of overall thermal efficiency of the vapor generator.

2. The combination of claim 1 wherein the three flow meters, the adjustable means and the two temperature devices establish electrical values representative of the measurements, and a balanceable electric network to which the electrical values are applied.

3. The combination of claim 1 wherein the last named means is a balanceable electric network, a motor means responsive to unbalance of the network, means positioned by the motor for rebalancing the network upon an unbalance thereof, and visual operation guiding means also positioned by the motor.

4. An efficiency meter for a boiler having feed water supply means and heated by the combustion of a plurality of different fluid fuels comprising in combination, a device for measuring steam flow from the boiler, a device for measuring the temperature of the steam, a device for measuring the temperature of the feed water entering the boiler, means responsive to said devices for determining a first potential proportional to the measurement of steam flow times the difference between the measurements of steam temperature and feed water temperature, separate meters for measuring the rate of supply of the different fluid fluels, means controlled by said meters for determining voltage potentials proportional to the rate of flow of the different fuels, adjustable means for selecting portions of said potentials representing the B. t. u. per unit heat value of the respective fuels, means for adding said selected potential portions, adjustable means for opposing a portion of said added potential portions to said first potential, means operating in response to an unbalance of said opposed potentials for adjusting said adjustable means, and efficiency indicating means positioned by said last mentioned means.

5. A steam boiler efficiency meter including, a steam flow meter, a temperature measuring device for the steam, a temperature measuring device for the feed water, means for interrelating the meter and devices to produce an electrical potential representative of B. t. u. absorbed by the feed water and steam, a rate of supply meter for the fuel to the boiler for combustion, means cooperating with the fuel rate meter producing an electrical potential representative of B. t. u. available for heating and vaporizing the feed water and heating said steam, and an electrical network opposing the potentials and singly manifesting their ratio as over-all boiler efficiency.

6. An efficiency meter for a vapor generator having liquid supply means and heated by the combustion of fluid fuel including, a rate of flow meter responsive to the rate of fuel supply establishing a corresponding potential, a potentiometer energized by the fuel potential, a temperature measuring device responsive to the liquid supply establishing a corresponding potential, a temperature measuring device responsive to the vapor discharge stream establishing a corresponding potential, a potentiometer energized by the difference between the two temperature potentials, a rate of flow meter responsive to the vapor leaving the generator varying the output of the temperature difference potentiometer, a balanceable network including the fuel potentiometer and the varied temperature difference potentiometer wherein the potentials of said potentiometers are opposed to create an unbalance, and means sensitive to the occurrence of network unbalance which restores balance and simultaneously gives a manifestation of the over-all thermal efficiency of the generator.

PAUL S. DICKEY.

REFERENCES CITED

The following references are of record in the file of this patent:

UNITED STATES PATENTS

| Number | Name | Date |
| --- | --- | --- |
| 2,252,367 | Germer | Aug. 12, 1941 |
| 2,293,403 | Razek | Aug. 18, 1942 |
| 2,305,769 | Germer | Dec. 22, 1942 |
| 2,310,955 | Hornfeck | Feb. 16, 1943 |
| 2,341,407 | Xenis et al. | Feb. 8, 1944 |
| 2,342,567 | Xenis et al. | Feb. 22, 1944 |
| 2,501,377 | Cherry | Mar. 21, 1950 |